May 29, 1956 J. W. GRATIAN 2,748,377

TELEMETERING TRANSMITTER

Original Filed Feb. 1, 1952 7 Sheets-Sheet 1

INVENTOR.
JOSEPH W. GRATIAN

BY T. L. Bowes
ATTORNEY

May 29, 1956 J. W. GRATIAN 2,748,377

TELEMETERING TRANSMITTER

Original Filed Feb. 1, 1952 7 Sheets-Sheet 2

INVENTOR.
JOSEPH W. GRATIAN

BY T. L. Bowes
ATTORNEY

INVENTOR.
JOSEPH W. GRATIAN
BY
T. L. Bowes
ATTORNEY

May 29, 1956 J. W. GRATIAN 2,748,377

TELEMETERING TRANSMITTER

Original Filed Feb. 1, 1952 7 Sheets-Sheet 4

INVENTOR.
JOSEPH W. GRATIAN
BY T. L. Bowes
ATTORNEY

INVENTOR.
JOSEPH W. GRATIAN
BY T. L. Bowes
ATTORNEY

INVENTOR.
JOSEPH W. GRATIAN

BY *J. L. Bowes*
ATTORNEY

INVENTOR.
JOSEPH W. GRATIAN
BY
T. L. Bowes
ATTORNEY

United States Patent Office 2,748,377 Patented May 29, 1956

2,748,377

TELEMETERING TRANSMITTER

Joseph W. Gratian, Rochester, N. Y., assignor, by mesne assignments, to General Dynamics Corporation, a corporation of Delaware Original application February 1, 1952, Serial No. 269,496, now Patent No. 2,730,699, dated January 10, 1956. Divided and this application August 25, 1953, Serial No. 378,525

8 Claims. (Cl. 340—206)

Figures 1, 2:
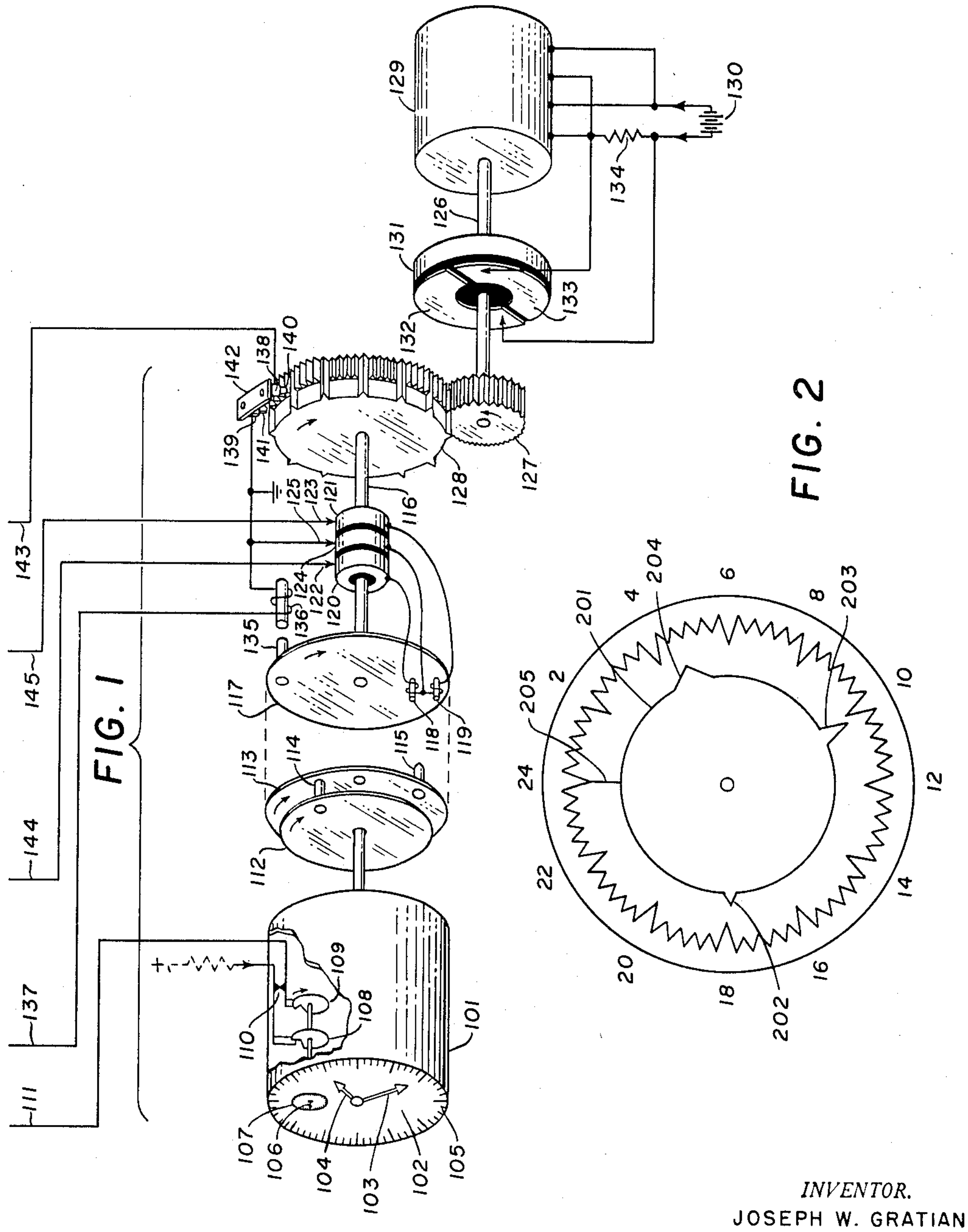

My invention relates to telemetering systems, and particularly to means for telemetering the position of an index member of a quantity indicating means.

The present application is a division of my application, Serial Number 269,496, filed February 1, 1952, Telemetering System, now Patent No. 2,730,699 dated January 10, 1956, and assigned to the assignee of the present application.

According to Webster's New International Dictionary, Unabridged, the word "telemeter" means "to transmit electrically to a distant station, and there indicate or record, the value of a quantity." This definition does not specify that the telemetering process is to occur instantaneously, and I therefore wish to employ the word in this specification to include the situation wherein the information derived is stored on a recording medium and later recovered from that medium. Furthermore, since my invention is adapted to the recovery of information at a location adjacent to the transmitting point, and since the recovery may occur simultaneously or at a later time, I do not wish to be limited through the dictionary definition of the word "telemeter" to the recovery of information at a distant point.

In this specification, I shall use the term "index member" to mean an indicating needle, hand, pointer, or the like, and I shall use "quantity-indicating means" to include devices such as meters, gages, knobs, or the like. I wish to point out that in telemetering systems of the sort in which my invention finds application, the index member is generally adapted to register against a scale of indicia which represent units or subunits of physical quantity. These units may be electrical units, units of pressure, temperature, humidity, etc., or may be units of time. The units may be abstract, as in a computing machine, where the quantity-indicating means may represent different physical quantities on various occasions. The scale may be merely associated with the index member, i. e., the presence of the scale may be implied even though it may be omitted because there is no human agency nearby to read it. Similarly, the presence of a pointer may be implied. Quantity-indicating means of the type to which my invention is applicable usually have an index member which is adapted for rotary movement, but a person skilled in the art could readily apply my invention to other types of motion, such as linear. Furthermore, one skilled in the art could readily convert linear motion into rotary motion, as by rock-and-pinion gearing. Half of the problem in telemetering information is transmission; the remaining half is the presentation of data at the reception point. In accordance with my invention, I employ a sampling technique to obtain the data at the transmitting end of the system and I use a cathode-ray tube to present the data at the receiving end. My invention has found particular application to telemetering the time of day as measured by a clock. In this case, the clock face is represented on the screen of a cathode-ray tube with the indicia representing hours and minutes as well as the position of the hands appearing as pips on concentric circles.

It, therefore, is an object of my invention to provide apparatus for combining in a single waveform a first and second series of pulses, wherein the individual pulses of said first and second series, respectively, occur at random times relative to each other, in such a manner that a single pulse results from coincidence in the time of occurrence of an individual pulse of the first series with an individual pulse of the second series.

It is a further object of my invention, to provide such apparatus wherein pulses of the above-mentioned first series have a greater amplitude than pulses of the above-mentioned second series, and the above-mentioned single pulse has an amplitude substantially the same as that of the pulses of the first series.

It is a still further object of my invention to provide such apparatus which includes means for generating the above-mentioned first and second series of pulses.

It is a still further object of my invention to provide apparatus for telemetering the instantaneous position of the hands of a clock.

It is a still further object of my invention to provide a generator for generating a series of pulses having uniform inter-pulse spacing, wherein every Nth one of the pulses has a greater amplitude than the other pulses.

Further objects and advantages of my invention will become apparent as the following description proceeds, and the features of novelty which characterize my invention wil be pointed out with particularity in the claims annexed to and forming a part of this specification.

Figure 8:
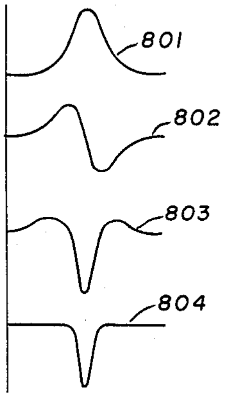
Figure 3:
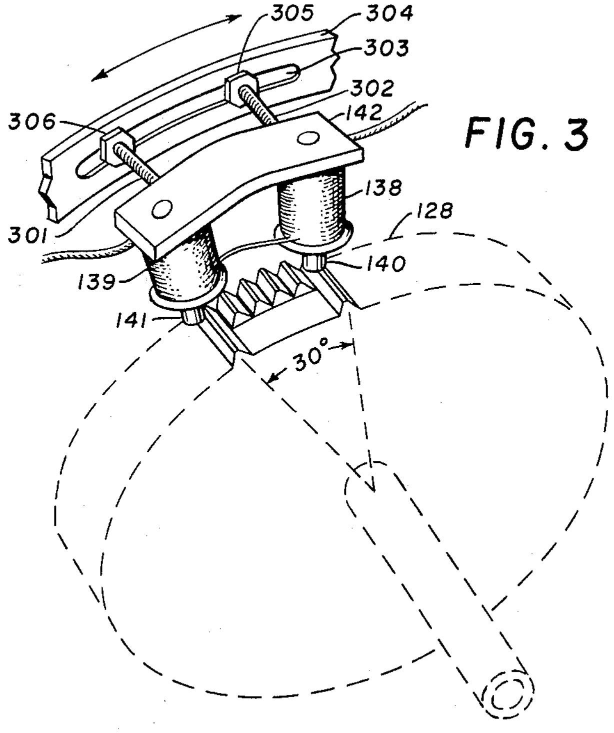
Figure 4:
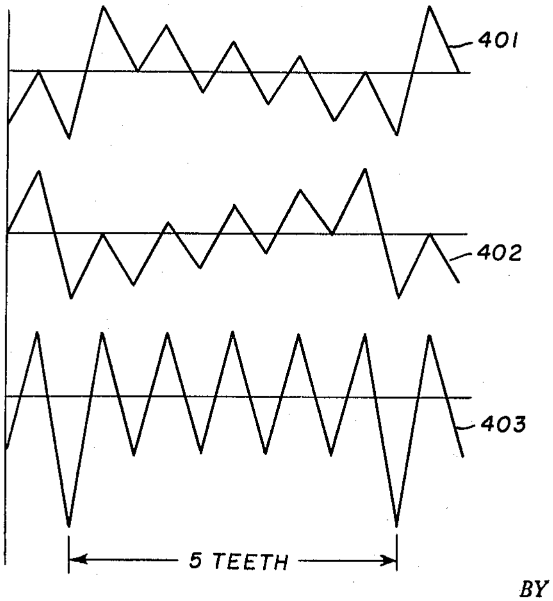
Figure 5:
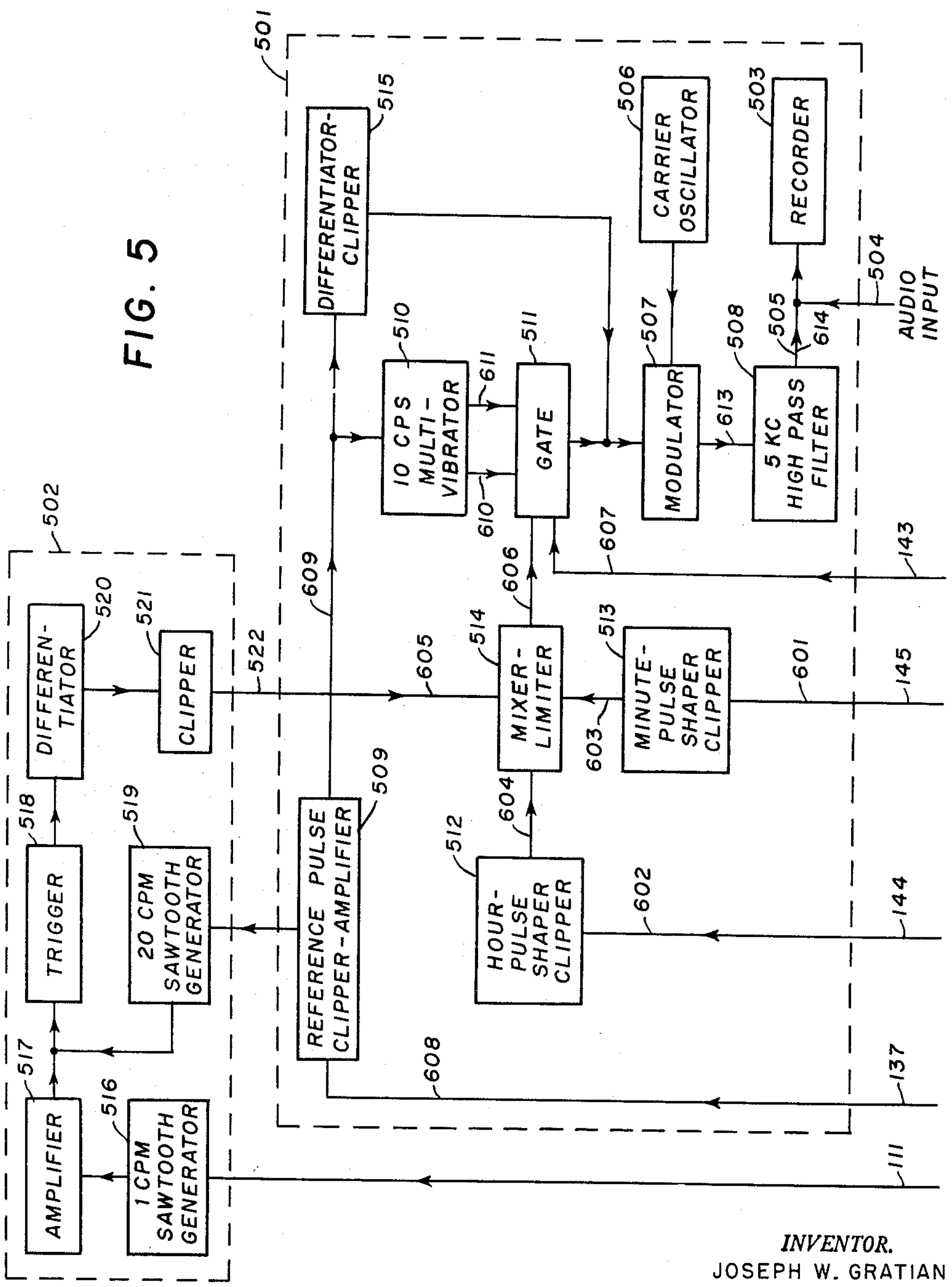
Figure 6:
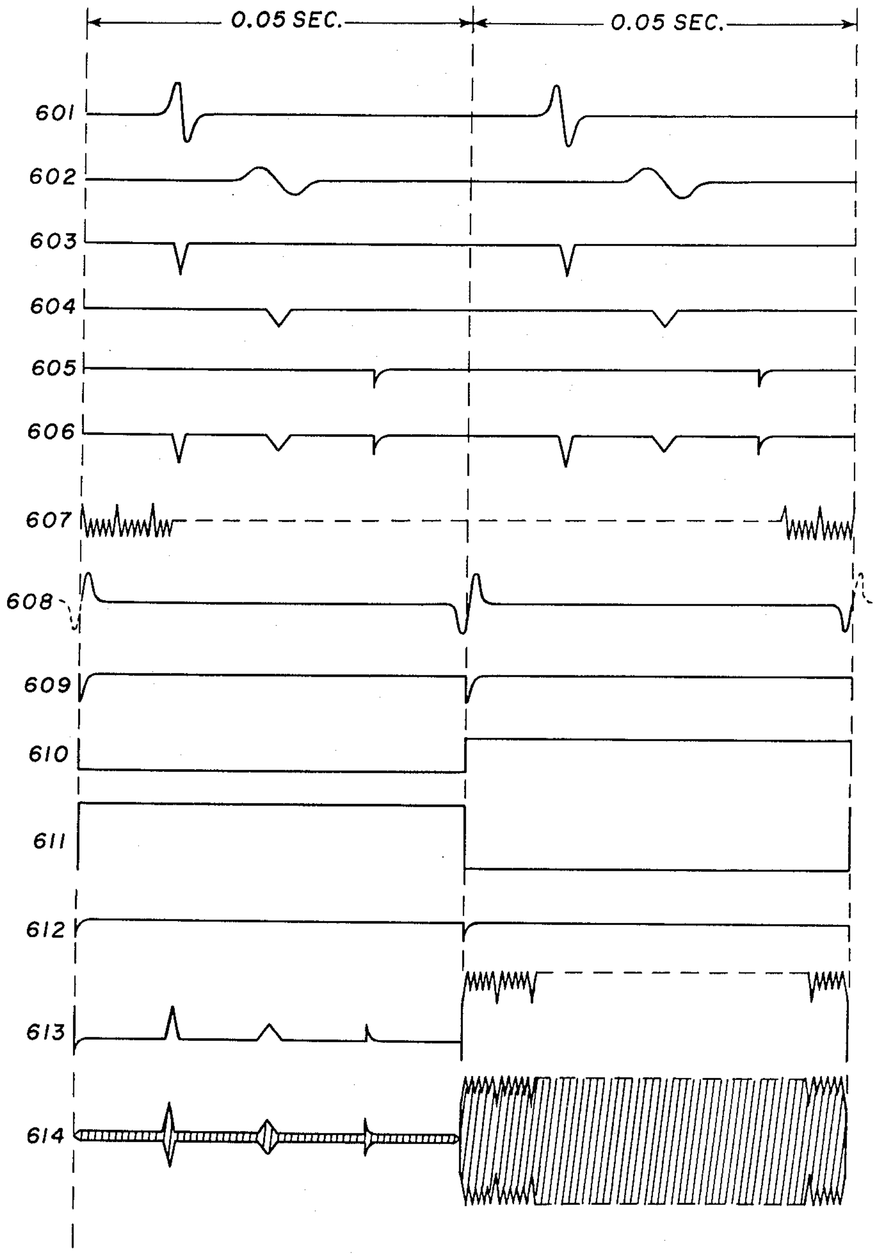
Figure 7:
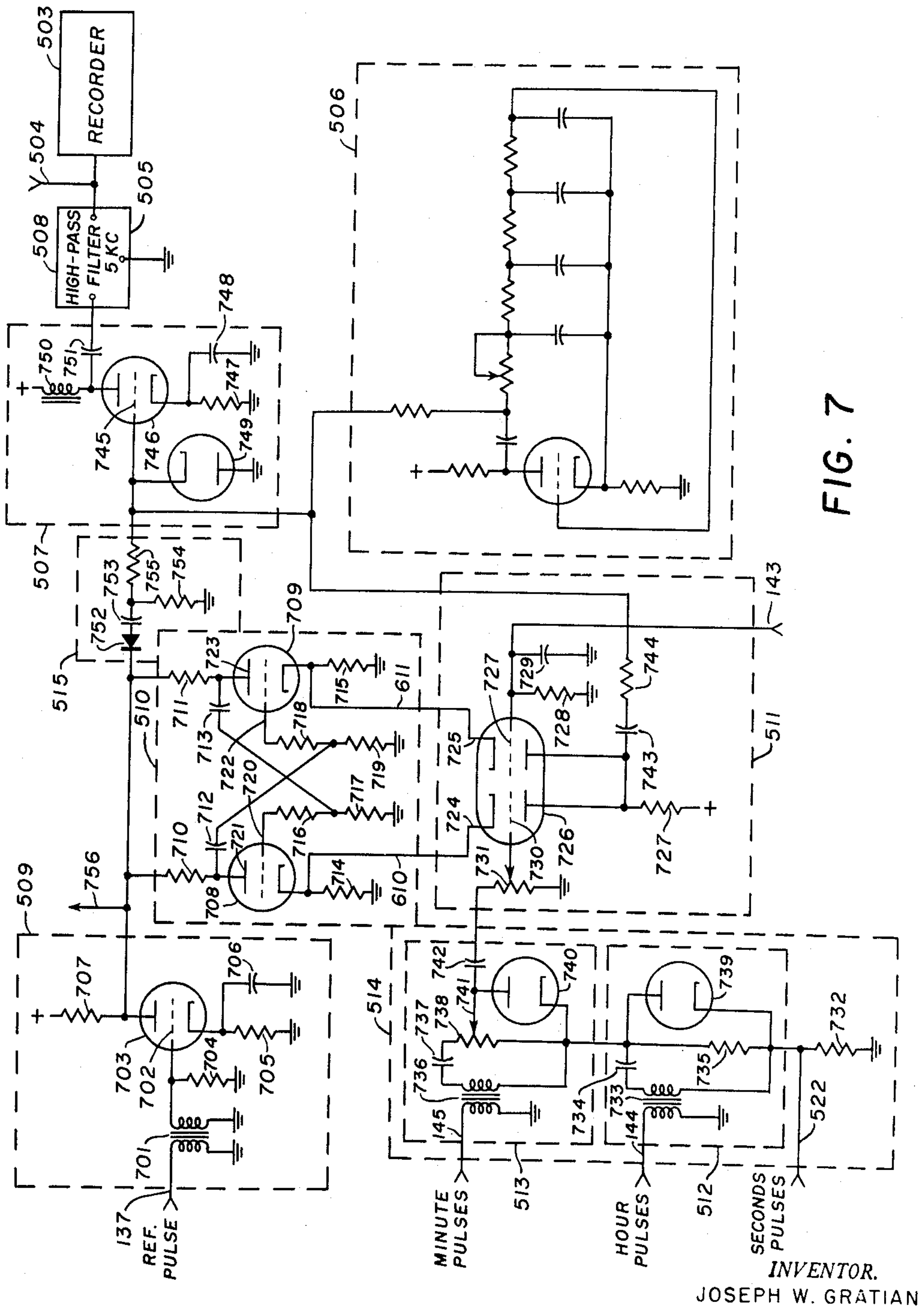

For a better understanding of my invention, reference may be had to the accompanying drawing in which Figure 1 is an exploded view of a portion of one embodiment of my invention, Fig. 2 is a view of the screen of a cathode-ray tube, at the receiver, on which the data derived from the embodiment of my invention shown in Fig. 1 is to be presented, Fig. 3 is a detailed view of a portion of the apparatus shown in Fig. 1, Fig. 4 is a chart of the waveforms associated with the apparatus illustrated in Fig. 3, Fig. 5 is a block diagram of apparatus comprising another portion of the embodiment of my invention shown partially in Fig. 1, Fig. 6 is a chart of the waveforms associated with the apparatus diagrammed in Fig. 5, Fig. 7 is a schematic wiring diagram of some of the apparatus shown in block diagram form in Fig. 5, Fig. 8 shows some of the waveforms encountered within the circuit of Fig. 7.

Figure 9:
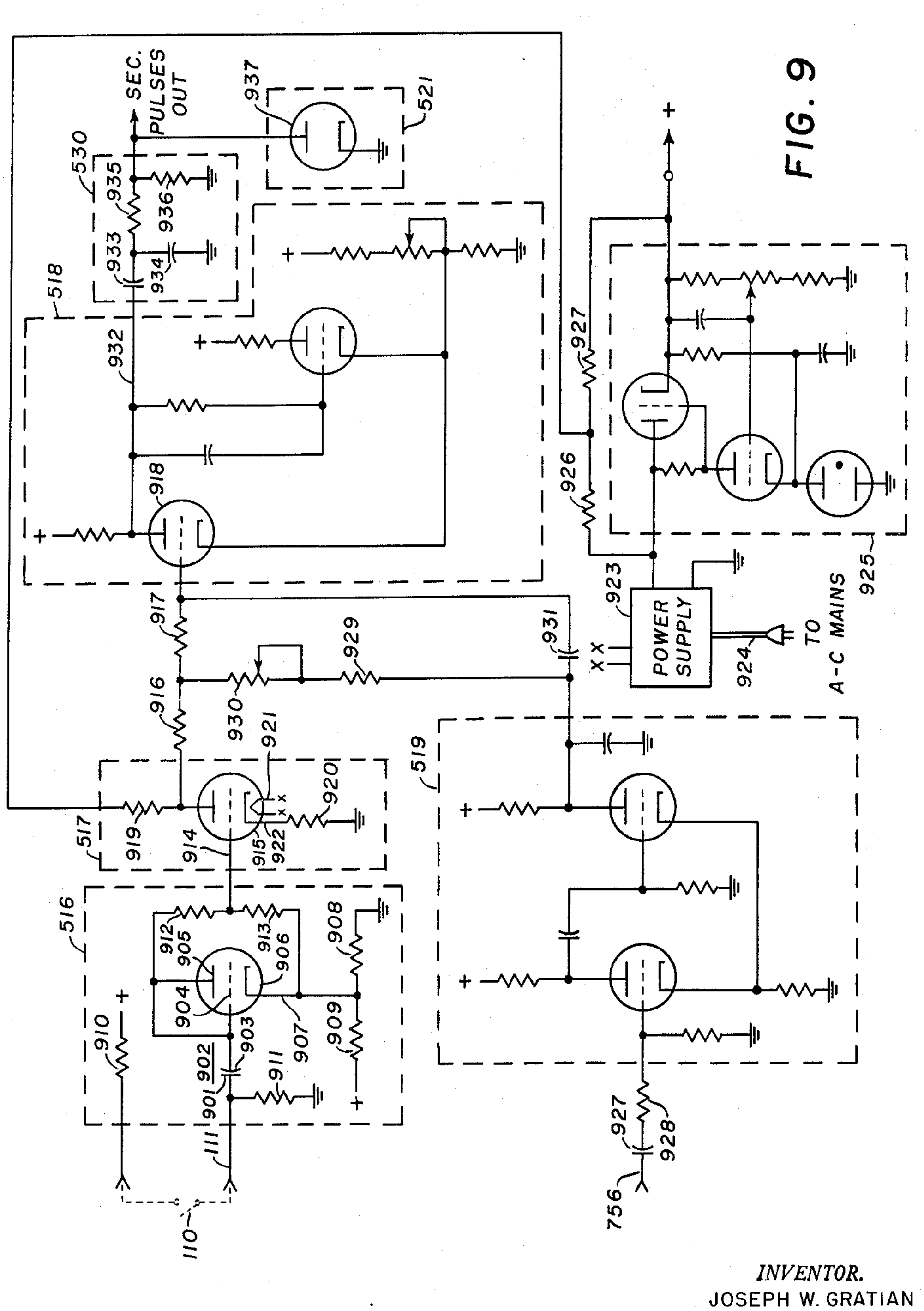
Figure 10:
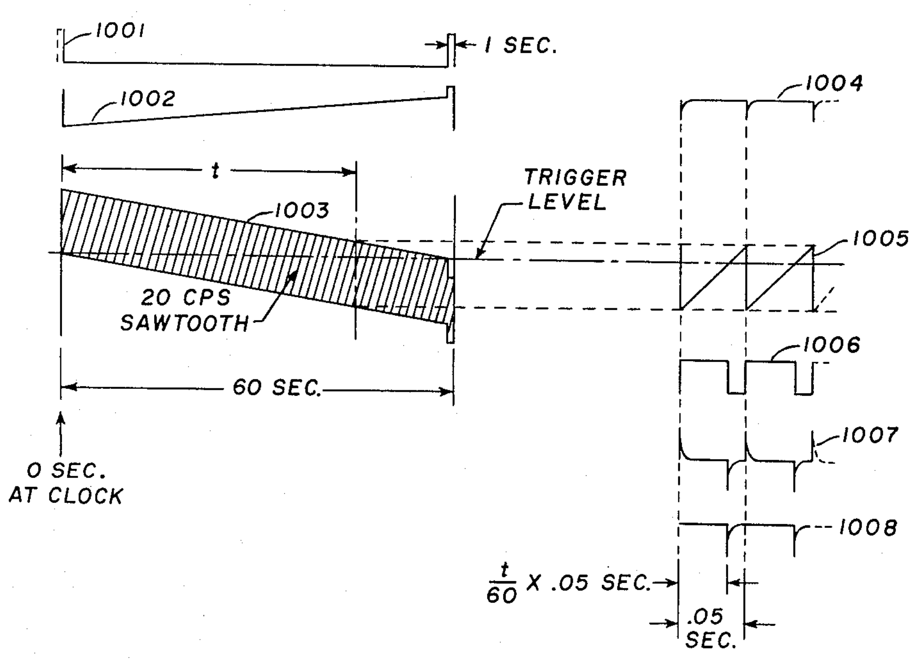

Fig. 9 is a schematic wiring diagram of another portion of the apparatus shown in block diagram form in Fig. 5, Fig. 10 illustrates waveforms encountered in the circuit of Fig. 9.

To simplify the explanation of the embodiment of my invention shown in these figures, I have adopted a system of assigning a block of reference symbols to each figure. Thus, numerals from 107 to 199 are reserved for Fig. 1, from 201 to 299 for Fig. 2, and so on. In this way, a reference to, say, symbol 1005 tells the reader that the thing identified by this symbol is to be found in Fig. 10.

As intimated earlier, a telemetering system basically comprises a transmitting end and a receiving end. The embodiment of my invention which I have elected to describe and show in the accompanying drawings has for its purpose the telemetering of information regarding time of day. Figs. 1 and 5 indicate the equipment included in the "time transmitter" at the transmitting end of the system.

*Basic time transmitter*

As shown in Fig. 1, the transmitting portion of this particular embodiment of my invention includes a suitable clock 101. This clock may have a 24-hour movement governed by an escapement of high precision and a motor for winding the main spring automatically as required to maintain optimum tension for maximum accuracy. The face 102 of the clock has a minute hand 103 and an hour hand 104. These hands register against a scale 105 of indicia around the periphery of the clock face. Seconds indication is provided by a second hand 106 having a separate scale of indicia 107. The clock 101 is shown with a portion of its case broken away in order to illustrate the presence of cams 108 and 109. These cams maintain contacts 110 closed throughout the 59th second only of each minute. A one-second pulse of voltage therefore appears on lead 111 for a purpose which will be explained later.

On the back portion of clock 101 are two coaxial, nonmagnetic disks 112 and 113, respectively keyed to the shafts carrying hour hand 104 and minute hand 103. Each disk carries a small permanent magnet (114 and 115, respectively) near its periphery. Magnet 114 is seen to have a blunter end than magnet 115 and to be mounted at a shorter distance from the center of the disks.

A shaft 116 is provided for rotation coaxial with the shafts carrying disks 112 and 113. To one end of shaft 116 is secured a scanning member 117. Two pickup coils, 118 and 119 are mounted on member 117. These coils are preferably located on a given radial line extending from the center of shaft 116, with the radial distances of each coil from that center being equal to the radial distance of magnet 114 and magnet 115, respectively, from the center of the shafts carrying disks 112 and 113. Member 117 is located, in the assembled, "unexploded" apparatus, sufficiently close to the rear end of clock 101 for magnets 114 and 115 to induce a pulse of current in coils 118 and 119, respectively, if passage of the coils past the magnets is sufficiently rapid. Pulses resulting from such passages are taken off the rotating portion of the apparatus by means of slip rings 120, 121 and brushes 122, 123, the ground return being through ring 124 and brush 125.

A continuous rotary motion is imparted to scanning member 117 by means of shaft 126 and gears 127 and 128. Shaft 126 is driven by motor 129, power for which is derived from battery 130. A governor 131 is preferably employed to maintain the speed of motor 129 substantially constant. Governor 131 may be a conventional type having commutator segments 132 and 133; its operation will not be described except to say that when the motor speed decreases to a predetermined point series field resistor 134 is short-circuited and consequently causes the motor to speed up. When the motor speeds up sufficiently, the opposite effect occurs. The net result is to maintain the speed of motor 129 substantially constant.

From the foregoing it can be seen that the positions of hands 103 and 104 are represented by magnets 114 and 115, respectively, and that these positions are "sampled" once in each revolution of scanning member 117. The information regarding the sampled positions of the hands is contained in the positions within the scanning period of the pulses induced in coils 118 and 119.

Scanning member 117 carries permanent magnet 135. At each rotation of the scanning member 117, magnet 135 passes a stationarily-mounted pickup coil 136. The air gap between magnet 135 and pickup coil 136 is sfficiently small when these elements are opposite each other to result in the generation of a pulse of voltage which thereupon appears on lead 137.

It will be noted that gear 128 has half of most of its teeth removed, only every fifth tooth extending clear across the gear face. Centered above the gear face is a pair of pickup coils 138 and 139 wound respectively on permanent magnet cores 140 and 141. These cores are held in spaced-apart relation by means of stationarily-mounted member 142. Coils 138 and 139, together with magnets 140 and 141 and member 142, form a stator, while gear 128 forms a rotor. As the gear 128 is driven past the pole faces of magnets 140 and 141, the reluctance of the magnetic path including the air gaps between the respective pole faces and the gear itself, is varied. The resulting variation in flux linking coils 138 and 139 therefore results in a voltage induced in those coils. This voltage appears on lead 143.

Fig. 2 illustrates how the time data gathered by the apparatus of Fig. 1, operating in conjunction with the elements indicated in Fig. 5, may be presented on the face of a cathode-ray tube. The time scale indicia are represented on the outer circular sweep as pips extending radially inward. Every fifth one of the indicia is identified by its greater radial length. Since clock 101 is a 24-hour clock, these longer indicia represent two-hour intervals of time when the hour hand is read, but represent the conventional five-minute intervals when the minute hand is read.

In the form of clock 101 which has found employment in the embodiment of my invention being described, the seconds hand shaft has torque sufficient only to actuate contacts 110, this actuation occurring only during the 59th second of each minute. Means are provided according to my invention, however, for seconds representation on the screen of a cathode-ray tube, and hence the longer ones of the indicia also represent five-second intervals relative to the second hand. The apparatus required to present seconds information may be omitted where such accuracy in telling time is not needed.

An inner circular trace 201 on the screen of the cathode-ray tube has pips extending radially outward to represent the positions of the time-indicating clock hands, including a second hand where second hand apparatus is employed. The second-hand pip is represented by reference symbol 202, the minute hand by reference symbol 203, and the hour hand by symbol 204. The hour hand representation is seen to be shorter and broader than the minute hand, in accordance with the conventional relative proportions of these hands on actual clocks. A reference mark 205 is provided to indicate the zero position of the hands and of the indicia scale alike. The time shown on the screen of the cathode-ray tube in Fig. 2 is 25 minutes and 45 seconds past 2 o'clock.

The relationship shown in Fig. 1 between gear 128 and coils 138 and 139 is shown in greater detail in Fig. 3. The support for these coils, member 142, is supported in turn by adjustable screws 301 and 302 which may be moved relative to slot 303 in bracket 304 by loosening nuts 305 and 306. Bracket 304 may be stationarily mounted by any convenient means.

It will be noted that the pole faces of magnets 140 and 141, have their centers spaced apart by a distance equal to five and one-half teeth on gear 128. Furthermore, coils 138 and 139 are connected in series opposition. This arrangement and spacing of the coils forms a feature of my invention, since the use of a variable reluctance indicia generator with only one coil and a gear wheel of the type shown would result in the unsymmetrical waveform illustrated by 401 in Fig. 4. It will be noted that a strong low-frequency component is present as the result of each fifth tooth extending farther across the gear face than the other gear teeth. According to my invention, however, the waveform 401 induced in one of the coils is added algebraically to waveform 402 induced in the other coil by means of the series-opposition connection. By means of the half-tooth displacement, the algebraic addition of waveforms 401 and 402 results in a waveform 403 having greater amplitude than either waveform 401 or 402, but with no low-frequency component. The distance between major peaks of waveform 403, it will be noted, corresponds to the spacing between the longer gear teeth.

A similar graphical analysis shows that the same result would obtain if the spacing were 4½ instead of 5½ teeth apart, and such a spacing is also within the scope of my invention. The arrangement may be generalized by saying that every Nth tooth, or protrusion, on gear 128 gives rise to a pulse of greater amplitude than the other teeth, and that by connecting pickup-coils 138 and 139 in series opposition and spacing apart the face centers of poles 140 and 141 by a distance equal to the distance between the Nth ones of the teeth plus or minus half the distance between adjacent teeth, the undesired low-frequency components are canceled from the output of the pickup coils. For a complete understanding of the "time transmitter," Fig. 5 is to be placed above Fig. 1 with the corresponding lines in alignment. Upon examination, Fig. 5 will be seen to comprise a main section 501 and a subsidiary section 502. The first of these sections is used to telemeter information regarding the scale of indicia and the positions of the hour and minute hands relative to those indicia. Subsidiary section 502, being designed to provide second-hand positional information electronically, is known as a "seconds generator." As pointed out earlier, its use, while forming a feature of my invention, is optional, depending upon whether second-hand information is desired at the receiving end of the telemetering system.

I have chosen to illustrate my invention as applied to a telemetering system in which the information is stored on a recording medium along with other information. For this reason, I indicate a recorder 503, which may be of the magnetic tape variety. The input line 504 may be a speech channel, for example, in which case input line 505 from the time-information apparatus carries energy in a frequency band above the speech band. This energy is derived from a carrier oscillator 506 and is modulated by modulator 507 in accordance with the time information to be telemetered. A high-pass filter 508 is employed to eliminate any time-information frequency components which may lie within the speech frequency bands.

I term the pulse appearing on lead 137 a "reference pulse." This reference pulse is first amplified in reference pulse amplifier 509 and is thereafter used to control multivibrator 510. In accordance with the preferred embodiment of my invention, motor 129 (Fig. 1) operates at an average speed of 3600 revolutions per minute, and the ratio of gear 128 to gear 129 is 1:3. This causes scanning member 117 to rotate at about 1200 revolutions per minute Reference pulses, being induced in pickup coil 136 once in each revolution, therefore have a separation of 1/1200 minute or 0.05 second. Multivibrator 510 consequently operates at a repetition rate of ten cycles per second. The output of multivibrator 510 is fed to gate circuit 511.

An "hour pulse" is induced in coil 118 (Fig 1) each time coil 118 is carried past magnet 114 by scanning member 117. This pulse is conveyed by way of slip ring 120, brush 122 and lead 144 to hour pulse shaper-clipper 512. Similarly, the "minute pulse" generated at each passage of pickup coil 119 past magnet 115 is conveyed via slip ring 121, brush 123 and lead 145 to minute pulse shaper-clipper 513. The outputs of shaper-clippers 512 and 513 are combined in mixer-limiter 514. The combined hour and minute pulses are fed to gate circuit 511, as are the indicia pulses appearing on lead 143. The output of the gate circuit is used to modulate energy from carrier oscillator 506 as previously explained.

Where seconds information is to be telemetered in a system, involving clock 101 or its equivalent, seconds generator 502 may be employed. The pulse generated in clock 101 by contacts 110 during the 59th second of each minute is conveyed via lead 111 to sawtooth generator 516, where it is used for synchronization. The magnitude of the resulting sawtooth, which of course has a frequency of one cycle per minute, is increased in amplifier 517 and fed to trigger circuit 518. Combined with the output of amplifier 517 is a sawtooth having a repetition rate of 20 cycles per second, this sawtooth being furnished by sawtooth generator 519. The latter is synchronized by reference pulses from the clipper-amplifier 509. As previously pointed out, the reference pulses occur once in each revolution of scanning member 117, or at a repetition rate of 20 pulses per second.

The output of trigger circuit 518 is differentiated by differentiator circuit 520, the output of the latter thereupon being shaped in clipper circuit 521 to form a "seconds pulse." This seconds pulse is fed to mixer-limiter 514, where it is combined with the hour and minute pulses.

The waveforms encountered in various portions of the block diagram in Fig. 5 are shown in Fig. 6. Two complete scanning periods are shown, each occupying, in the embodiment shown, 0.05 second. Waveform 601 shows a typical position within the scanning period of the minute-hand pulse picked up by coil 119, this pulse therefore appearing at the input of minute pulse clipper-shaper 513. Similarly, waveform 602 shows a typical position of the hour-pulse within the scanning period. After shaping in unit 513, waveform 601 is changed to waveform 603, while shaping of waveform 602 in unit 512 produces waveform 604. A typical output of seconds generator 502 is shown by waveform 605.

After mixing in unit 514, waveforms 603—605 are combined to form waveform 606. It is to be understood that the positions of the minute-, hour-, and second-hand pulses within the scanning period of 0.05 second are proportional to the time of day relative to the basic 24-hour period, as shown by the minute and hour hands of the clock and as derived from seconds generator 502.

The indicia pulses appearing on lead 143 are shown by waveform 607 while the reference pulses appearing on lead 137 are illustrated in waveform 608. Waveform 608, after shaping in unit 509, becomes the waveform shown at 609. Since waveform 609 is used to control multivibrator 510, the waveforms emerging from the latter unit are those shown by waveforms 610 and 611. The waveform supplied from differentiator-clipper 515 is seen at 612.

According to the present embodiment of my invention, the "hand pulses" alternate in the transmission sequence with the indicia pulses, the alternation being supplied by gate circuit 511 under the control of waveforms 610 and 611 from multivibrator 510. Therefore the combined hand-pulse and indicia information appears as in waveform 613 at the input to modulator 507. The carrier energy modulated in accordance with waveform 613 consequently appears as in waveform 614, and it is this waveform which is recorded by unit 503 in this embodiment of my invention.

For a further explanation of the operation of the apparatus shown by the block diagram of Fig. 5, reference may be had to the detailed circuit diagram given in Fig. 7. In the latter figure, dashed lines have been drawn around various portions of the circuit to indicate those components which comprise the various blocks of Fig. 5; it is to be understood that these dashed lines are not intended to represent shielding or mechanical linkage.

Reference pulses comprising waveform 608 and appearing on lead 137 are first increased in amplitude by means of input transformer 701 of unit 509, after which they are applied to the grid 702 of vacuum tube 703. Resistor 704 to ground provides proper grid loading, while resistor 705, by-passed by capacitor 706, biases tube 703 virtually to cut off. The output of this stage is therefore clipped, as indicated by waveform 609, and appears across plate load resistor 707. This waveform is applied to multivibrator circuit 510 and also to differentiator-clipper 515.

Multivibrator 510 is seen to be a symmetrical type employing triode tubes 708 and 709. Each of these has a plate resistor (710 and 711 respectively), a cross-coupling capacitor (712 and 713 respectively), a cathode resistor (714 and 715 respectively) and a grid voltage divider (resistors 716, 717 and 718, 719, respectively). This multivibrator is of the bistable type, and changes state only when the pulses shown in waveform 609 are impressed on their plate supply circuit from the output of reference pulse clipper amplifier 509. The voltages appearing across cathode resistors 714 and 715 are both square waves, but are of opposite phase, being indicated by waveforms 610 and 611 respectively. I employ the term "square wave" in this specification in its commonly accepted sense, meaning a waveform having substantially square corners.

The operation of multivibrator 510 is as follows: Assume that when the circuit is turned on, tube 708 is conducting. When a negative pulse (waveform 609) is applied to the low-potential end of resistor 711, it passes through capacitor 713 and resistor 716 to grid 720 of tube 708. This negative pulse on the grid decreases the plate current of tube 708. The decreased plate current results in a lowered drop across resistor 710, thereby increasing the potential at plate 721 of tube 708. This increased potential is passed through capacitor 712 and resistor 718 to raise the voltage on grid 722 of tube 709. This causes tube 709 to conduct. The increased plate current through tube 709 causes a greater drop across resistor 711, and this decreased potential is transferred to grid 720 as previously outlined, thereby accelerating the transfer of conduction status from tube 708 to tube 709. When tube 709 is fully conductive, a quiescent state obtains until the next pulse of waveform 609 is received from reference pulse clipper-amplifier 509. The circuit thereafter alternates the conducting state between tubes 708 and 709 as subsequent pulses are received. Since the circuit is of symmetrical configuration, the explanation would be equally applicable had tube 709 been conducting when the circuit is first turned on.

Square wave 610 appears across resistor 714 while 611 appears across resistor 715. The latter waveform has greater amplitude than the former because resistor 715 is larger than resistor 714. Square waves 610 and 611 are directly coupled to cathodes 724 and 725, respectively, of tube 726. The plates of tube 726 are connected in parallel to load resistor 727. Grid 727 of tube 726 is connected to lead 143, upon which appear the indicia pulses induced in pickup coils 138 and 139. Resistor 728 and capacitor 729 form a filter which reduces the noise level in the indicia circuit. The second input grid 730 is fed from gain control 731, which in turn is fed from mixer-limiter circuit 514.

Circuit 514 cannot easily be separated diagrammatically from circuits 512 and 513, and hence has been represented within a single dashed rectangle, including the latter two circuits. However, the operation of the functional blocks shown will be apparent from the following description.

Clipped seconds pulses (waveform 605) arriving from unit 521 are applied across resistor 732. Hour pulses (waveform 602) appearing on lead 144 are increased in amplitude by transformer 733 and are differentiated through the action of transformer 733, capacitor 734 and resistor 735. Similarly, minute pulses (waveform 601) appearing on lead 145 are increased in amplitude by transformer 736, and are differentiated through the action of transformer 736, capacitor 737 and resistor 738.

The pulses resulting from the two differentiating processes are symmetrical and considerably sharper than the input pulses delivered from the pickup coils 118 and 119. This can be seen in Fig. 8, where waveform 801 represents the flux cut by pickup coil 118 as it passes magnet 114. Waveform 802 represents the induced voltage, the latter being the derivative of the flux waveform 801. The differentiation performed by capacitor 734 and resistor 735 thus produces waveform 803, which has a single sharp downward point. The final waveform of Fig. 8, 804, is produced by the clipping action of diode 739 shunting resistor 735. Similar waveforms obtain for the minute pulses, in which case the clipping action is performed by diode 740. The mixing function of unit 514 is accomplished by connecting resistors 732, 735 and 738 in series. Output may therefore be taken from adjustable tap 741 of resistor 738 and fed through coupling capacitor 742 to the input resistor 731 of multivibrator circuit 511.

The use of separate clipper diodes forms a part of my invention because the obvious way of clipping is to use a single diode across resistor 731. The latter arrangement results in a loss of hand identity as the hand pulses approach time coincidence, i. e., as the hands of the clock approach an overlapping condition. Overlap occurs once an hour, and loss of hand identity would make it impossible to tell time exactly. The loss of identity occurs when positive portions of the differentiated hour hand pulse (cf. waveform 803) cancel negative portions of differentiated minute hand pulses, and vice versa. Subsequent clipping, as of the output across resistor 731, would have no effect on this deleterious action. Individual clipping in accordance with my invention as disclosed above, however, eliminates all positive portions of the differentiated hand-pulse waveforms and so cancellation problems cannot occur.

Further consideration of the problems involved in unit 514 shows that time coincidence of the bands would ordinarily result in a single enlarged pulse, due to the adding of the individual clipped hand pulses (cf. waveform 804). An extra diode across the output of resistor 731 would limit the amplitude of this pulse, but would cause excessive broadening and hence loss of accuracy in telling time. I overcome these difficulties in accordance with my invention by proportioning the constants of the circuit such that diode 740 conducts and diode 739 is cut off when both hour- and minute-hand pulses are present, but only then.

The situation is indicated in the equivalent circuit, Fig. 15. It is assumed for analysis that the back resistance of the diodes is infinite and their forward resistance is zero. The diodes have been therefore drawn as open or closed switches, depending upon whether they are considered in the non-conducting or conducting states, respectively.

Let $E_1$=voltage due to minute hand pulse,
$E_2$=voltage due to hour hand pulse,
$R_1$=equivalent series impedance of minute hand pulse source,
$R_2$=equivalent series impedance of hour hand pulse source,
$R_3$=equivalent output impedance of circuit,
$E_{01}$=component of output voltage due to $E_1$,
$E_{02}$=component of output voltage due to $E_2$.

$E_{01}$ may be found by considering the case where diode $D_1$ is conducting and diode $D_2$ is not. Thus $$E_{01}=\frac{E_1R_3}{R_1+R_3}$$

Similarly, $E_{02}$ may be found by considering the case where diode $D_2$ is conducting and $D_1$ is not. Then $$E_{02}=\frac{E_2R_3}{R_2+R_3}$$

For a desired $$\frac{E_{02}}{E_{01}}=A=\frac{E_2R_3}{R_2+R_3}\div\frac{E_1R_3}{R_1+R_3}=\frac{E_2}{E_1}\frac{(R_1+R_3)}{(R_2+R_3)}$$

or $$\frac{E_2}{E_1}=A\frac{(R_2+R_3)}{(R_1+R_3)} \qquad (1)$$

If $i_2 \geqq i_1$ (the situation shown in Fig. 15), $$\frac{E_2}{R_2+R_3}\geq\frac{E_1}{R_1}$$

and hence $$\frac{E_2}{E_1}\geq\frac{R_2+R_3}{R_1} \qquad (2)$$

From (1) and (2), $$A\frac{R_2+R_3}{R_1+R_3}\geq\frac{R_2+R_3}{R_1}$$

from which $$R_3 \leqq R_1\,(A-1) \qquad (3)$$

$R_2$ may then be determined from (1). In the particular circuit embodiment shown in Fig. 7, the constants may be chosen to produce substantially the equivalent values obtained from the formulas.

It will be observed that the arrangement shown provides negative limiting as well as positive clipping, and hence is widely useful in the electrical arts. I particularly wish to point out that the circuit I have shown and explained is not limited to pulse inputs; the inputs may be continuous waveforms, including direct currents. In the embodiment shown, an amplitude ratio of minute pulses to hour pulses of 2 to 1 results in a superimposed pulse amplitude less than 5% greater than the minute hand pulse alone.

From the foregoing it is seen that one input of gate circuit 511 comprises indicia pulses (waveform 607), while the other input comprises waveform 606, the combined hour, minute and second hand (where used) pulses. The square waveforms of opposite polarity on the cathodes of multivibrator tubes 708 and 709 (waveforms 610 and 611, respectively) cause the two sections to conduct alternately, and therefore the output taken from the plates through coupling capacitor 743 and isolating resistor 744 is the combined waveform 613. Waveform 613 is applied to the grid 745 of tube 746 in modulator unit 507. Cathode bias is provided for this tube by resistor 747, which is by-passed by capacitor 748.

Carrier-frequency energy from carrier oscillator 506 is also applied to grid 745. Oscillator 506 is preferably the conventional RC type indicated but may be any other type capable of oscillating at the desired frequency. An explanation of RC oscillators is given in F. E. Terman, "Radio Engineering," McGraw-Hill Book Company, Inc., New York, N. Y., 1937; p. 437, and hence will not be repeated here. In the present embodiment of my invention, the oscillator may operate at approximately 6.7 kc./sec., for example.

Some of the output from the reference pulse clipper-amplifier 509 is passed through differentiator-clipper 515 to the modulator unit 507. Differentiator-clipper 509 comprises a diode 752 which I have shown as being of the crystal type, and a differentiating network comprising capacitor 753 and resistor 754. The differentiated output, waveform 612, is applied to the grid 745 of tube 746 through isolating resistor 755. Inclusion of waveform 612 in the information stored on the recording medium improves the squareness of the waveform recovered upon playback.

Diode 749 is connected from grid 745 to ground. This diode and the 5 kc./sec. high-pass filter, 508, perform the functions of a modulator. Diode 749 removes virtually all of the negative portions of the mixed signals supplied by oscillator 506 and gate 511, whereupon the resulting asymmetrical waveform, together with the low-frequency components of waveform 613, is amplified in tube 746. The amplified output appearing at the plate of tube 746 is impedance-coupled, by means of inductor 750 and capacitor 751, to 5 kc./sec. high-pass filter 508. The latter unit removes undesired low-frequency components. The waveform resulting is 614, and contains all of the time information to be telemetered. This waveform is combined with the speech information placed on channel 504 and both are stored by recorder 503.

*Seconds generator*

The purpose of seconds generator 502 is to produce a pulse once in each revolution of scanning member 117. In other words, the output pulse of trigger circuit 518 must occur within the total scanning period of 0.05 second at a time which is proportional to the time elapsed from the start of the then-present minute.

The voltage pulse derived from contacts 110 of clock 101 is shown in Fig. 10 as waveform 1001. Contacts 110, it will be recalled, close at the start of the fifty-ninth second and remain closed until the end of the minute. The closing of contacts 110 applies positive voltage from resistor 910 to plate 901 of capacitor 902, momentarily causing the other plate, 903, to assume a positive potential also. Positive voltage consequently appears on plate 905, to which grid 904 is connected, of tube 906. Under these conditions, tube 906 conducts, thereby allowing capacitor 902 to charge through resistor 910, contacts 110, lead 111, capacitor 902, tube 906, and resistor 908 to ground. It will be noted that cathode 907 of tube 906 is biased by positive voltage obtained from a voltage divider comprising resistors 908 and 909.

When contacts 110 are closed and capacitor 902 has been charged, plate 903 of capacitor 902 has a negative charge with respect to plate 901. This negative charge, being applied plate 905 and grid 904, effectively cuts off tube 906. At the end of the minute, positive voltage is removed from plate 901 of capacitor 902 due to the opening of contacts 110. Since tube 906 is now cut off because of the negative charge on plate 904, the charge on capacitor 902 leaks off through a path including resistor 911, capacitor 903, resistor 912, resistor 913, and resistor 908. Resistors in this group are of high total resistance, and the time constant of the RC circuit involved is on the order of more than a minute. Thus it is seen that the voltage across capacitor 902 furnishes a 1 C. P. M. sawtooth voltage. This voltage, waveform 1002, is taken from the junction of resistors 912 and 913, and so forms the output of 1 c./min. sawtooth generator 516.

Waveform 1002 is applied to grid 914 of tube 915 in amplifier 517. Because of the long time-constant involved, amplifier 517 must be direct-coupled throughout. However, this circumstance means that variations in the voltage applied to filament 921 of tube 515 will cause variations in the emision current of cathode 922. According to a feature of my invention, I supply voltage to filament 921 from power source 923 over leads indicated by X—X. Power source 923 is arranged to supply B+ voltage as well as filament voltage to the time translator, both voltage supplies being derived from the same A.-C. main via line 924. To provide adequate stability in other circuits of the time transmitter, I provide an electronic voltage regulator 925. This regulator is of conventional construction and its operation may be understood from a description given in J. G. Brainerd (ed.), "Ultra-High-Frequency Techniques," D. Van Nostrand Company, Inc., New York, N. Y., 1942; p. 73. In accordance with my invention, I provide resistors 926 and 927 connected in series from the input to the output of the regulator, and I supply the plate of tube 915 from the junction of these resistors.

Suppose, for example, that the A.-C. voltage supplied to power supply 923 increases. Filament voltage on leads X—X increases, as does the input to regulator 925. Cathode emission increases due to the increased filament voltage, and the voltage at the plate of tube 915 consequently decreases due to the larger drop across plate load resistor 919. If resistor 919 were connected to the input of regulator 925, the increase in B+ voltage would be greater than the drop due to increased filament voltage; and if the connection were made to the output of the regulator, there would be no compensatory effect at all. But supplying resistor 919 from the junction of resistors 926 and 927, and by proportioning the values of the latter two resistors, I am able to compensate exactly for increases in filament voltage. Similar reasoning shows that the same means will compensate for decreases in filament voltage also. This system of filament voltage compensation is claimed in my copending application, Serial No. 273,900, filed February 28, 1952, now Patent 2,710,349. The output of tube 915 is fed through resistors 916 and 917 to the grid of tube 918 in trigger unit 518. Also appearing on this grid is waveform 1005, which is coupled from unit 519 through resistors 929 and 930 in series to the junction of resistors 916 and 917. A portion of the output waveform of sawtooth generator 519 is fed through capacitor 931 directly to tube 918, in order to improve the high frequency response of waveform 1005.

Unit 519 is a conventional cathode-coupled multivibrator operating at 20 cycles per second. This circuit, being of conventional design, will not be described here. (For a complete description of its operation, see M. S. Kiver, "Television Simplified," D. Van Nostrand Company, Inc., New York, N. Y., 1948; p. 257.) The 20 c./sec. multivibrator is governed by waveform 609 derived, by way of coupling capacitor 927 and isolating resistor 928, from reference pulse clipper-amplifier 509.

Trigger 518 comprises a conventional astable multivibrator circuit of the Schmitt type; when its bias level is exceeded, it changes from one state to another for a length of time determined by the time constants involved. The operation of the Schmitt circuit is described in B. Chance (ed.), "Waveforms," vol. 19 of the MIT Radiation Laboratory Series, McGraw-Hill Book Company, New York, N. Y., 1949, p. 165.

Since trigger 518 cannot fire until its bias level is exceeded, it is apparent that a trigger pulse will be generated only when the combined 1 c./min. and 20 c./sec. sawtooth voltages (waveform 1003) are greater than the bias voltage. This may be seen with greater clarity in another portion of Fig. 10; here waveform 1004 is a representation to a different scale of waveform 609 in Figure 6. Waveform 1005 is the 20 c./sec. sawtooth output of unit 519. It will be noted that the time scale is considerably expanded from that shown for waveform 1003 because the latter precludes representation of individual sawteeth of the 20 c./sec. sawtooth generator.

Waveform 1005 illustrates in detail how each sawtooth of the 20 c./sec. sawtooth generator crosses the trigger level line of trigger 518. However, it will be noted by comparison with waveform 1003 that each sawtooth starts at a lower level than the preceding one in the series, due to the presence of the 1 c./min. sawtooth. In other words, each sawtooth crosses the trigger level line at a time within its own 0.05-second interval later than the preceding sawtooth crossed in its own 0.05-second interval. Since each crossing of the trigger level line by individual sawtooth of waveform 1005 causes firing of trigger 518, it is apparent that the output of the latter unit, waveform 1006, consists of succeedingly later square waves until the end of the minute is reached and the process is repeated.

Square waves of waveform 1006 are differentiated by differentiator 520, which consists of capacitors 933 and 934 and resistors 935 and 936. Waveform 1007 therefore results. Positive peaks are removed from waveform 1007 through the action of clipper diode 937 in clipper 521, thus furnishing waveform 9008. The latter waveform comprises the desired seconds pulses, shown earlier on a different scale as waveform 605. These negative seconds pulses, since they occur at the trailing edge of the square waves in waveform 1006, appear at increasingly later times in each 0.05-second interval as a given one-minute period is traversed.

What I claim is:

1. In a telemetering system, the combination of a plurality of index members having a common axis and mounted for independent rotation about said axis; a plurality of magnetic means, each of said magnetic means being mounted for rotation with individual ones of said index members about said axis; a continuously-rotating scanning member; a plurality of magnetic pickup means located on said scanning member, the individual ones of said magnetic pickup means being mounted for encounter with the corresponding individual ones of said magnetic means at least once in each scanning period, whereby said encounters cause pulses to be induced in each said pickup means, said pulses occurring at random times relative to each other, depending on the relative positions of said index members; and means for combining pulses from each said pickup means into a single waveform such that in case of time coincidence of an individual pulse from one of said pickup means with an individual pulse from another of said pickup means there results a single pulse having an amplitude substantially the same as that of the larger of the said individual pulses.

2. The combination of claim 1 in which said last named means comprises: a first impedance; means for impressing said pulse from said one of said pickup means across said first impedance; a first electron discharge device having at least an anode and a cathode, said anode being connected to the high-potential end of said first impedance, and said cathode being connected to the low-potential end of said first impedance; a second impedance connected in series with said first impedance; means for impressing said pulse from said other one of said pickup means across said second impedance; a second electron discharge device having at least an anode and a cathode, said anode of said second discharge device being connected to the high-potential end of said second impedance and said cathode of said second electron discharge device being connected to the low-potential end of said second impedance; and means for obtaining the combined output of said pulses from said one and said other one of said second pickup means across the series connection of said first and second impedances.

3. In a pulse system, the combination of a first and a second series of pulses having the same polarity, the individual pulses of said first and second series of pulses occurring at random times relative to each other, the pulses of said first series having greater amplitude than pulses of said second series; and means for combining said first and second series of pulses in a single waveform such that a single pulse results from time coincidence of an individual pulse of said first series with an individual pulse of said second series, said single pulse having an amplitude substantially the same as that of the pulses of said first series, and the identity of said pulses is substantially maintained as said pulses approach toward, and recede from, time coincidence.

4. In a pulse system, the combination of a first and a second series of pulses having the same polarity, the individual pulses of said first and second series of pulses occurring at random times relative to each other, the pulses of said first series having greater amplitude than pulses of said second series; and means for combining said first and second series of pulses in a single waveform such that a single pulse results from time coincidence of an individual pulse of said first series with an individual pulse of said second series, said single pulse having an amplitude substantially the same as that of the pulses of said first series; said means comprising: a first impedance; means for impressing said first series of pulses across said first impedance; a first electron discharge device having at least an anode and a cathode, said anode being connected to the high-potential end of said first impedance and said cathode being connected to the low-potential end of said first impedance; a second impedance connected in series with said first impedance; means for impressing said second series of pulses across said second impedance; a second electron discharge device having at least an anode and a cathode, said anode of said second electron discharge device being connected to the high-potential end of said second impedance and said cathode of said second electron discharge device being connected to the low-potential end of said second impedance; and means for obtaining the combined output of said first and second series of pulses across the series connection of said first and second impedances.

5. In a reluctance generator for generating pulses, the combination of means for generating a series of pulses having uniform inter-pulse spacing, every Nth one of said pulses having greater amplitude than the others of said pulses, said means comprising: a generally wheel-shaped member rotatable about an axis through said member; means for continuously rotating said wheel-shaped member, the circumferential region of said member having protrusions of magnetic material thereon, every Nth one of said protrusions being larger than others of said protrusions, yet all said protrusions being spaced apart by distances proportional to said inter-pulse spacing; magnetic means having a plurality of poles, each of said poles having a winding thereon and having a face, said windings being connected series-opposing, said magnetic means being stationarily mounted to achieve flux linkage between said poles and said protrusions as said protrusions are swept past said pole faces by said wheel-shaped member, thereby varying the reluctance of the path between said protrusions and said poles and hence inducing in said windings said series of pulses having amplitude and spacing proportional to the width and spacing, respectively, of the corresponding ones of said series of pulses; the face centers of said poles being spaced apart by a distance equal to the distance between said Nth ones of said protrusions plus half the spacing between adjacent ones of said protrusions, whereby a component induced in said windings due to the repetition rate of said Nth pulses is cancelled from the output of said windings.

6. In a reluctance generator for generating pulses, the combination of means for generating a series of pulses having uniform inter-pulse spacing, every Nth one of said pulses having greater amplitude than the others of said pulses, said means comprising: a generally wheel-shaped member rotatable about an axis through said member; means for continuously rotating said wheel-shaped member, the circumferential region of said member having protrusions of magnetic material thereon, every Nth one of said protrusions being larger than others of said protrusions, yet all said protrusions being spaced apart by distances proportional to said inter-pulse spacing; magnetic means having a plurality of poles, each of said poles having a winding thereon and having a face, said windings being connected series-opposing, said magnetic means being stationarily mounted to achieve flux linkage between said poles and said protrusions as said protrusions are swept past said pole faces by said wheel-shaped member, thereby varying the reluctance of the path between said protrusions and said poles and hence inducing in said windings said series of pulses having amplitude and spacing proportional to the width and spacing, respectively, of the corresponding ones of said series of pulses; the face centers of said poles being spaced apart by a distance equal to the distance between said Nth ones of said protrusions minus half the spacing between adjacent ones of said protrusions, whereby a component induced in said windings due to the repetition rate of said Nth pulses is cancelled from the output of said windings.

7. In a telemetering system, the combination of a clock having a plurality of hands for indicating time, said hands having a common axis of rotation; a plurality of magnetic means, each of said magnetic means being mounted for rotation with individual ones of said hands about said axis; a continuously-rotating scanning member; a plurality of magnetic pickup means located on said scanning member, the individual ones of said magnetic pickup means being mounted for encounter with corresponding individual ones of said magnetic means at least once in each scanning period of said scanning member, whereby said encounters cause pulses to be induced in each said pickup means, said pulses occurring at random times relative to each other, depending on the relative position of said hands; and means for combining said pulses from each said pickup means into a single waveform such that in case of time coincidence of an individual pulse from one of said pickup means with an individual pulse from another of said pickup means there results a single pulse having an amplitude substantially the same as that of the larger of said individual pulses.

8. In a pulse system, the combination of means for generating a first pulse effective to mark the beginning of a first period of time; means for generating a train of second pulses marking the beginnings of a plurality of second periods of time, said second periods of time being subdivisions of said first period of time; and means for generating a marker pulse within each said second period of time, the ratio of time elapsed from the beginning of each individual said second period of time to the time of occurrence of the corresponding marker pulse being equal to the ratio of time elapsed from the beginning of said first period of time to the beginning of said individual second period of time.

References Cited in the file of this patent

UNITED STATES PATENTS

| | | |
|---|---|---|
| 2,403,889 | Di Toro | July 9, 1946 |
| 2,609,143 | Stibitz | Sept. 2, 1952 |
| 2,680,241 | Gridley | June 1, 1954 |